(12) United States Patent
Morito et al.

(10) Patent No.: US 6,310,956 B1
(45) Date of Patent: Oct. 30, 2001

(54) COPY PROTECTION APPARATUS AND METHOD

(75) Inventors: Hajime Morito, Yokohama; Hiroshi Yoshiura, Kawasaki, both of (JP); Michael Roe, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/254,882

(22) Filed: Mar. 16, 1999

(30) Foreign Application Priority Data

Mar. 19, 1998 (EP) ................................. 98302094

(51) Int. Cl.[7] .................................................. G06F 12/14
(52) U.S. Cl. ......................... 380/201; 713/176; 705/57
(58) Field of Search .................................. 380/201, 202, 380/203; 340/825.31, 825.34; 705/57, 32, 58, 51, 59; 713/200, 201, 202, 176

(56) References Cited

U.S. PATENT DOCUMENTS

| | | | | |
|---|---|---|---|---|
| 5,495,411 | * | 2/1996 | Ananda | 705/32 |
| 5,548,645 | * | 8/1996 | Ananda | 380/4 |
| 5,699,370 | * | 12/1997 | Kaniwa et al. | 714/811 |
| 5,940,504 | * | 8/1999 | Griswold | 380/204 |

FOREIGN PATENT DOCUMENTS

| | | |
|---|---|---|
| 667720 | 8/1995 | (EP) . |
| WO97/26733 | 7/1997 | (WO) . |

OTHER PUBLICATIONS

Call for Proposals Issued by the Data Hiding SubGroup of the Copy Protection Technical Working Group, Version 1.0 Jul. 1997.

Electronics & Communication Engineering Journal, Feb. 1997, vol. 9, No. 1, Special Issue on Digital Video Broadcasting (Index).

Tudor P.N. MPEG-2 Video Compression, Electronics & Communication Engineering Journal, Dec. 1995, vol. 9, No. 6, pp. 257–264.

DVB Channel Coding Standards for Broadcasting Compressed Video Services, G.M. Drury, Electronics & Communication Engineering Journal, Feb. 1997, 9, (1), pp. 11–20.

* cited by examiner

Primary Examiner—James P. Trammell
Assistant Examiner—Elisca Pierre E
(74) Attorney, Agent, or Firm—Mattingly, Stanger & Malur, P.C.

(57) ABSTRACT

An apparatus and method of copy protection for use in digital data recorders such as DVD-RAM recorders, which includes embedding transmission time information into a digital data stream by digital watermarking and comparing the transmission time with the current time at the data recorder (30, 50). If the time difference is less than a threshold value it is presumed that the recording is for time-shifting purposes, namely recording a programme to watch later, which is generally allowed by copyright laws. If the time difference is greater than a threshold value it is presumed that the recording is an attempted unauthorised recording such as from a pre-recorded copy, and further recording is prevented.

29 Claims, 12 Drawing Sheets

COPY PROTECTION APPARATUS AND METHOD

FIELD OF THE INVENTION

This invention relates to copy protection, particularly but not exclusively to an apparatus and method for protecting digital data from unauthorised copying and a digital data recording apparatus capable of preventing such unauthorised copying.

BACKGROUND OF THE INVENTION

Although digital media such as audio CDs and CD-ROMs allow perfect reproduction of digital data, the problems of controlling unauthorised reproduction are to some extent mitigated by the fact that these media are generally available in read-only form, so that the potential infringer needs specialist recording and CD-pressing equipment to make high quality copies.

However, the introduction of Digital Versatile Disk (DVD) technology, which aims to make low cost digital recorders widely available, has raised the need for sophisticated copy protection systems, to prevent extensive piracy. With the increasing provision of information, entertainment and other contents in digital form, for example digital video broadcasting (DVB) by satellite, cable television and digital terrestrial television (DVB-T) as well as through networks such as the Internet, DVD recorders, known as DVD-RAM recorders, have been developed to record such contents in digital form. Eventually, it is envisaged that such recorders will replace the various different forms of currently available storage equipment, including computer hard-disk drives and video cassette recorders.

The principles of DVD are well established, with DVD-RAM recorders such as the Hitachi GF-1000 series available on the market. Reference is directed to the substantial information on the Internet relating to DVD principles and products, including at <http://fp97.inet-images.com/dvd/index.html> and <http://www.videodiscovery.com/vdyweb/dvd/dvdfaq.html>, and to "DVD Demystified", by Jim Taylor, published by McGraw-Hill.

Without any form of copy control, digital data received via television or over the Internet can be recorded by a DVD-RAM recorder or other digital recorder onto a digital recording medium such as a recordable DVD disk, from which it can be further copied numerous times onto other DVD disks, without any degradation in the copy quality.

A method that prevents unauthorised copying by embedding copy control signals in data prior to transmission, has been proposed by Nikkei Electronics, and is detailed on the Internet at http://www.dvcc.com/dhsg/CFP-v.10.rtf. This is a response to a Call for Proposals issued by the Data Hiding SubGroup of the Copy Protection Technical Working Group, Version 1.0, July 1997, at http://www.dvcc.com/dhsg.

The proposed method uses a copy control signal which may take one of four possible values: Copy-Free, indicating that the contents can be copied freely, Never-Copy indicating that the contents can never be copied, Copy-Once, indicating that the contents can be copied only once and No-More-Copy, indicating that the contents have already been copied once and that further copies cannot therefore be made.

Figure 1:
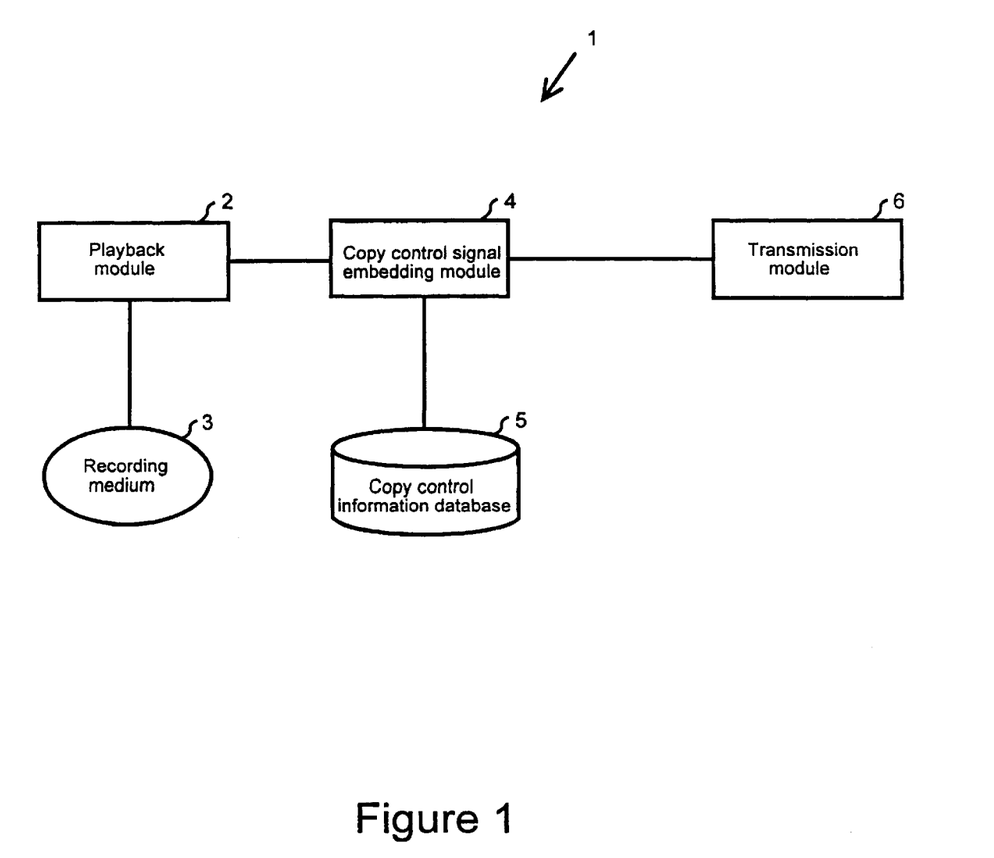
FIG. 1 is a schematic block diagram of data transmitting apparatus illustrating a known method of copy protection.

The structure of the transmission apparatus 1 for the proposed method is shown in FIG. 1. A playback module 2 reads data from the medium 3 on which it is recorded and sends it to the copy control signal embedding module 4. The embedding module 4 obtains the copy control signal to be embedded from the copy control information database 5, embeds it into the data using a suitable technique, for example, by applying a digital watermark, and sends the data to the transmission module 6. The transmission module 6 then transmits the data in a conventional way, for example broadcasting it via digital satellite, digital terrestrial television or digital cable television.

Figure 2:
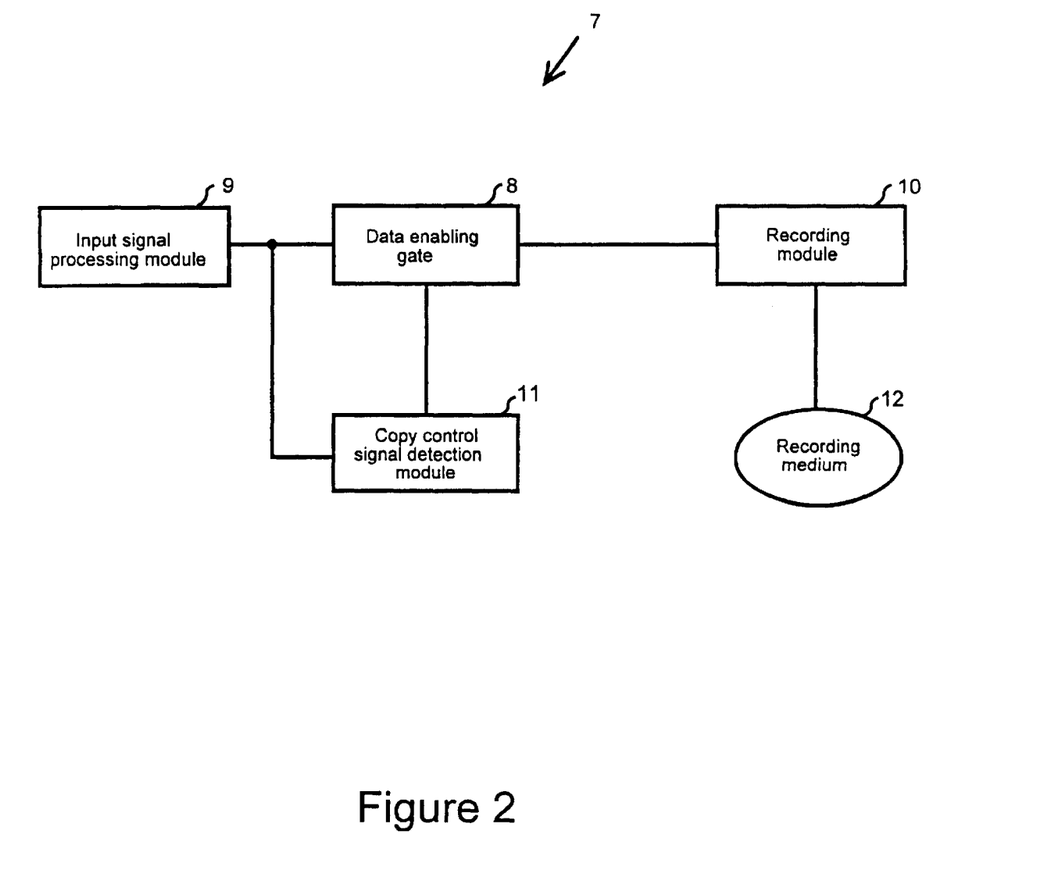
FIG. 2 is a schematic block diagram of data recording apparatus for use with the known copy protection scheme of FIG. 1.

The structure of the recording apparatus 7 for the proposed method is shown in FIG. 2. A data enabling gate 8 lies between an input signal processing module 9 and a recording module 10, the gate 8 only allowing data to pass to the recording module 10 in accordance with the copy control signal determined by the copy control signal detection module 11. If data is allowed to pass to the recording module 10, it is recorded to an appropriate recording medium 12, such as a recordable DVD disk.

Figure 3:
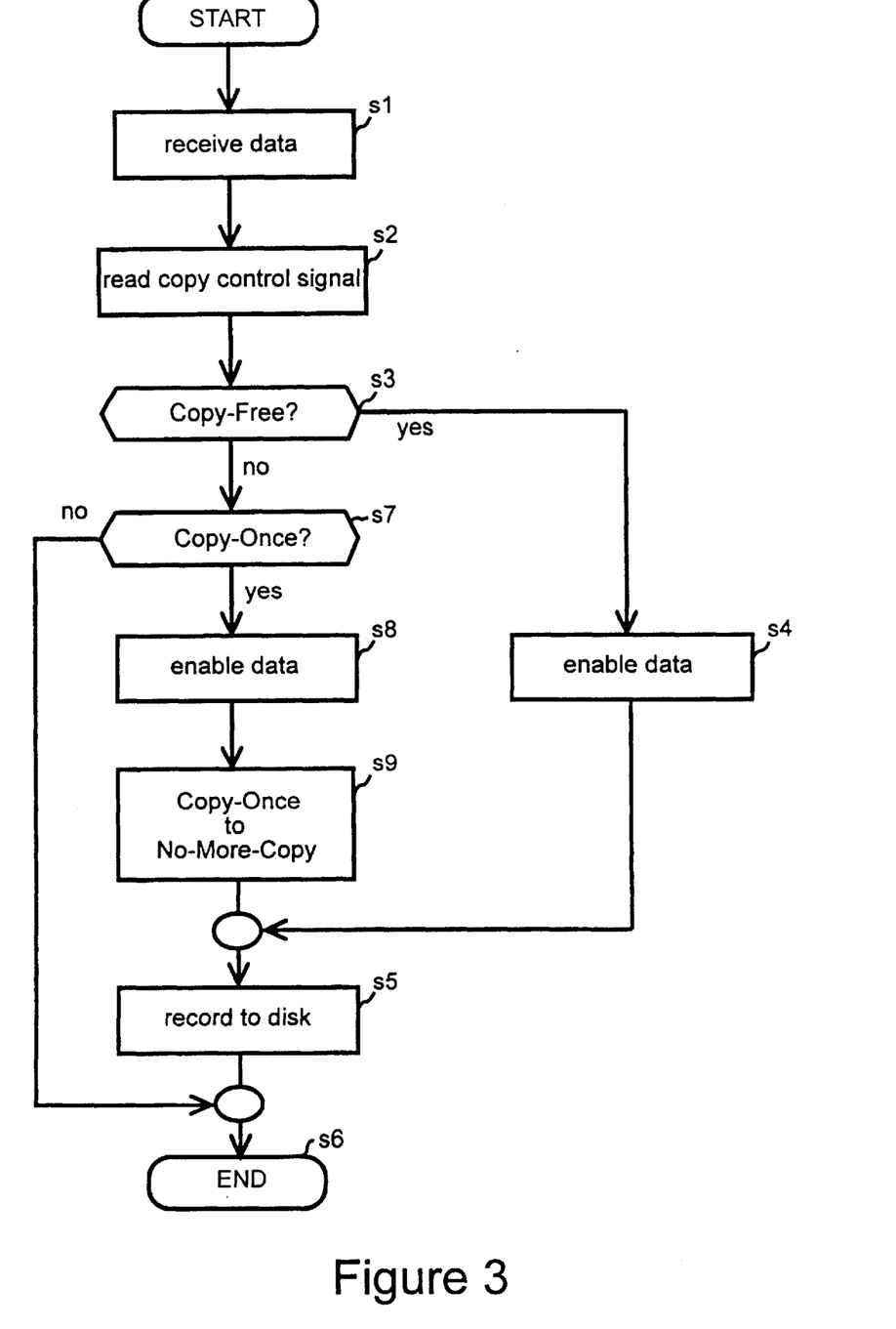
FIG. 3 is a flow diagram illustrating the operation of the recording apparatus of FIG. 2.

FIG. 3 is a flowchart showing the detailed operation of the recording apparatus 7. The input signal processing module 9 reads data input to the recording apparatus 7 at step s1 and sends it to the copy control signal detection module 11, which detects the copy control signal embedded in the data at step s2. At step s3, the signal detection module 11 determines if the Copy-Free signal is present. If it is present, control proceeds to step s4 at which a signal is sent to the data enabling gate 8 which in turn allows the data to pass to the recording module 10. Control passes to step s5 at which the data is recorded to the recording medium 12. The sequence of recording apparatus operations stops at step s6.

If, on the other hand, the Copy-Free signal is not detected at step s3, step s7 is executed at which the signal detection module 11 determines whether the Copy-Once signal is present. If the Copy-Once signal is not detected, the only possibilities remaining are that the copy control signal is set to Never-Copy or No-More-Copy. In either case, recording is not permitted, so control passes to terminating step s6. In this case, no enabling signal is sent to the data enabling gate 8, so that the received data is unable to pass to the recording module 10.

In the event that the Copy-Once signal is detected at step s7, control passes to step s8, at which an enabling signal is sent to the data enabling gate 8 which in turn allows the data to be sent to the recording module 10. Control then passes to step s9, at which the recording module 10 changes the embedded Copy-Once signal to No-More-Copy, so that further recordings are prevented. Step s5 follows, at which the recording module 10 records the data, including the new embedded copy control signal, onto the appropriate recording medium 12.

As a result of the above operations, the data on the recorded medium 12 contains one of three possible copy control signals: Copy-Free, Never-Copy or No-More-Copy. The Copy-Once signal is eliminated, so that further recording is only permitted if the data was originally designated Copy-Free.

Figure 4:
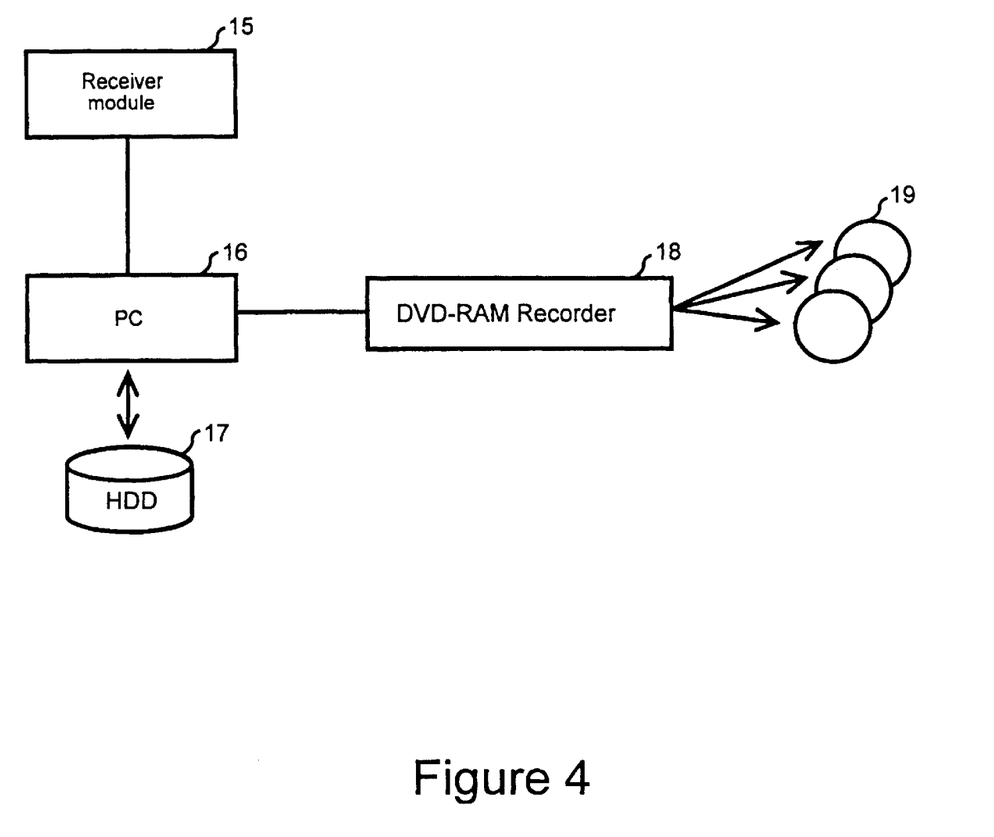
FIG. 4 illustrates a method of circumventing the known copy protection scheme of FIG. 1.

While this method of copy protection is suitable where all recording devices include copy control signal detection, a problem arises when data is recorded onto devices which do not have such detection facilities. For example, referring to FIG. 4, with the continual increase in the speed and storage capacity of personal computers, it is possible to use a conventional digital receiver 15 linked to a personal computer (PC) 16 to receive digital data marked as Copy-Once. The data can be stored on the computer's hard disk drive (HDD) 17 as received, namely with the Copy-Once signal still embedded. When the data stream from the hard disk 17 is subsequently sent through the PC 16 to the DVD-RAM recorder 18, the recorder acts according to the appropriate branch of the flow chart in FIG. 3 (s3-s7-s8-s9-s5), changing the Copy-Once signal to No-More-Copy and making a single recording of the data stream onto, for example, a recordable DVD-video disk 19, from which no further copies can be made. However, since the original data is stored in Copy-Once format on the hard disk 17, this recording process can be repeated many times to produce a large number of high quality copies on individual disks 19.

SUMMARY OF THE INVENTION

The present invention aims to address the above problem.

According to a first aspect of the invention, there is provided copy protection apparatus comprising data transmission apparatus including means for associating information related to the transmission time of the data with the data to be transmitted, and data recording apparatus for recording data received from the transmission apparatus including means for comparing the transmission time information with information related to current time so as to determine difference data which is a function of the time difference between the data transmission time and the current time, and means for determining on the basis of the difference data whether recording of the received data is to be permitted.

There is further provided data transmission apparatus comprising means for associating information related to the transmission time of the data with the data to be transmitted, such that when the data is received by corresponding data recording apparatus, the transmission time information can be compared with information related to current time so as to determine difference data which is a function of the time difference between the transmission time and the current time, and to determine on the basis of the difference data whether recording of the data is to be permitted.

There is also provided data recording apparatus for recording data transmitted thereto, the data being associated with information related to the data transmission time, comprising means for comparing the transmission time information with information related to current time so as to determine difference data which is a function of the time difference between the data transmission time and the current time, and means for determining on the basis of the difference data whether recording of the data is to be permitted.

The recording permission determination means may comprise means for permitting recording of the received data if the determined difference data falls below a predetermined threshold value and/or means for preventing recording of the received data if the determined difference data exceeds a predetermined threshold.

The present invention also provides a digital video recorder comprising: a digital video data receiver for receiving video data with which information related to the data transmission time is associated, means for recovering the transmission time information associated with the received data, means for comparing the recovered time information with information related to current time so as to determine difference data which is a function of the time difference between the data transmission time and the current time, and means for determining on the basis of the difference data whether recording of the received video data is to be permitted.

The present invention further provides a recordable data storage device for a computer comprising means for receiving digital data transmitted thereto, the data being associated with information related to the data transmission time, means for recovering the transmission time information associated with the received data, means for comparing the recovered time information with information related to current time so as to determine difference data which is a function of the time difference between the data transmission time and the current time, and means for determining on the basis of the difference data whether recording of the received data is to be permitted.

A method according to the invention provides a method of copy protection for a data recorder comprising receiving data with which information related to the data transmission time is associated, recovering the transmission time information associated with the received data, comparing the recovered time information with information related to current time so as to determine difference data which is a function of the time difference between the data transmission time and the current time, and determining on the basis of the difference data whether recording of the received data is to be permitted.

The difference data may comprise the time difference between the data transmission time and the current time.

The implementation of a comparison of time information between a transmitted data stream and an internal timer at the recording apparatus may assist in closing loopholes in the current copy protection scheme, so that devices which do not provide copy control functions cannot be used to circumvent the copy protection scheme when the data is subsequently recorded onto recording apparatus having comprehensive copy control functions.

BRIEF DESCRIPTION OF THE DRAWINGS

Embodiments of the invention will now be described by way of example with reference to the accompanying drawings, in which.

DETAILED DESCRIPTION

Figure 5:
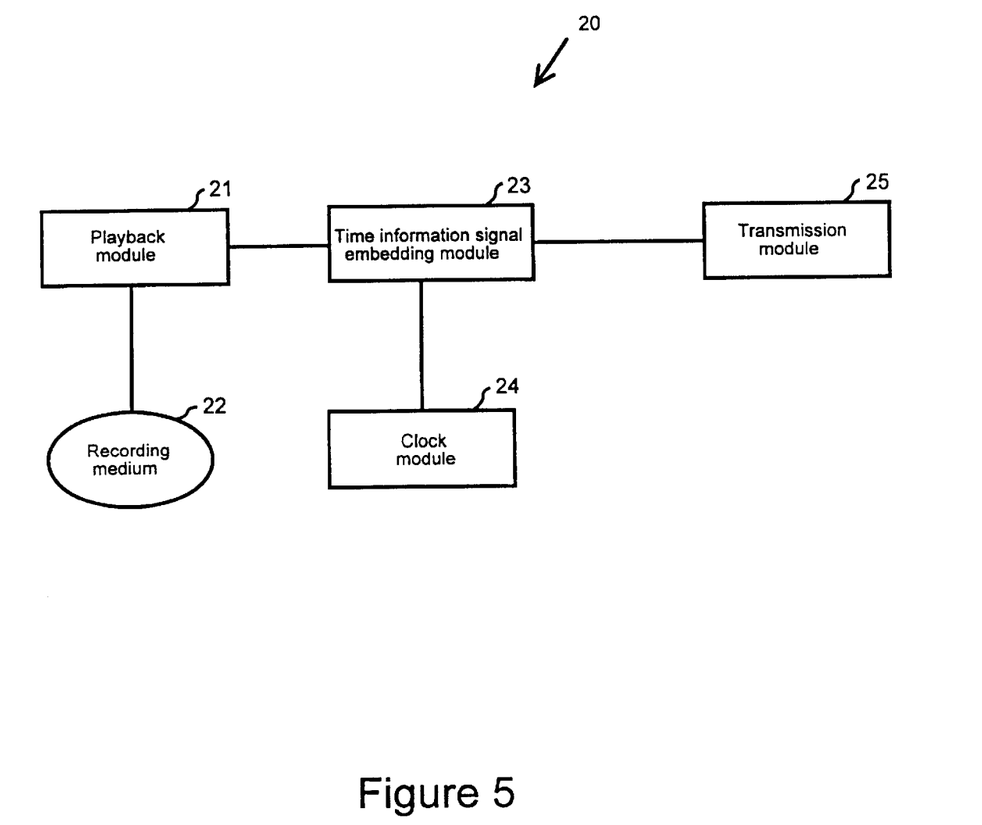
FIG. 5 is a schematic block diagram of data transmitting apparatus according to a first embodiment of the invention.
Figure 6:
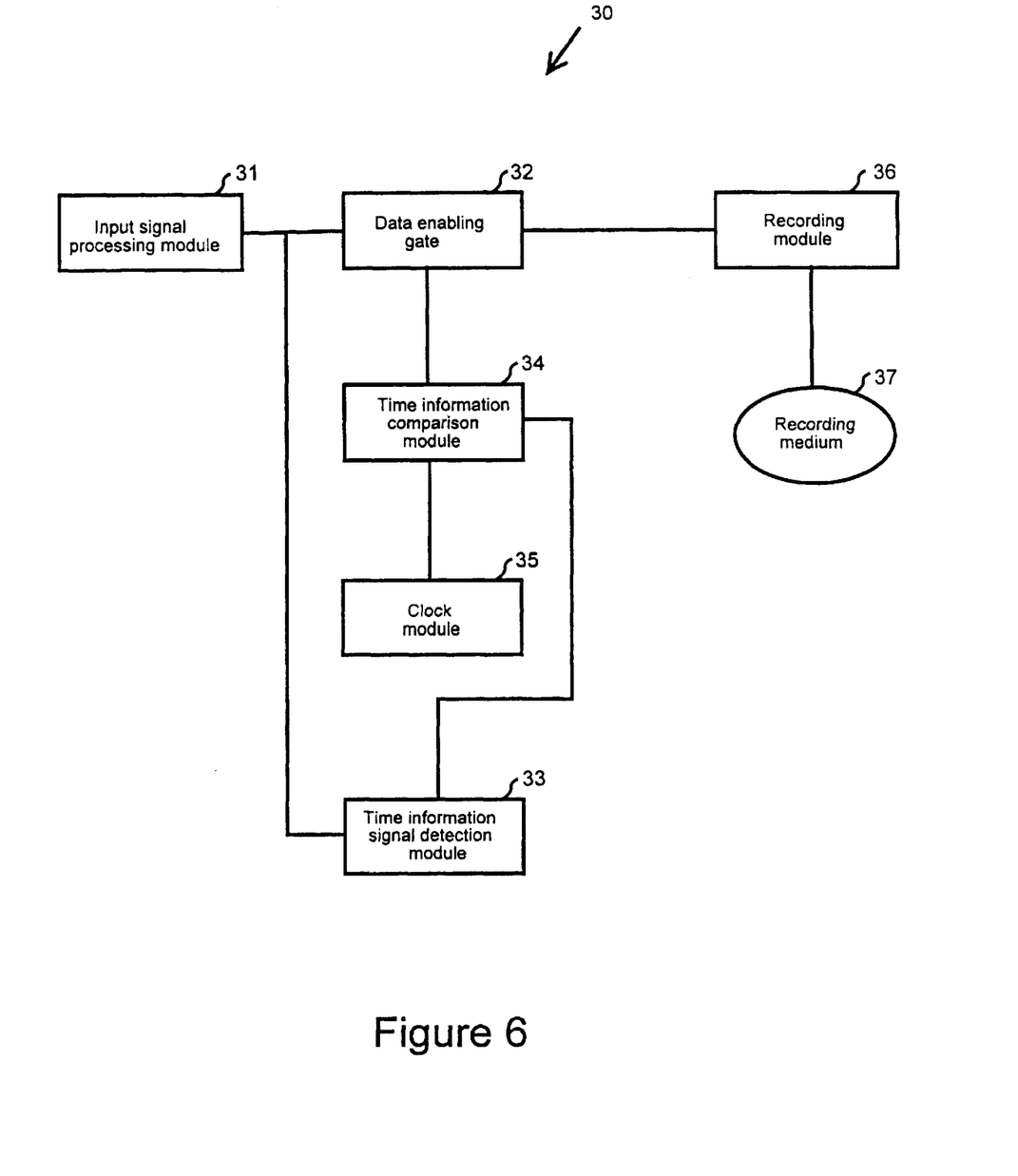
FIG. 6 is a schematic block diagram of data recording apparatus according to a first embodiment of the invention.

Referring to FIGS. 5 and 6, a system according to the invention comprises transmission apparatus 20 and recording apparatus 30, for example, forming part of a digital satellite broadcasting system. The techniques of digital video broadcasting (DVB) are well-known and suitable for various types of media including satellite broadcasting, cable television and digital terrestrial television. Prior to broadcast, video data is digitally compressed, for example, using the industry standard MPEG-2 compression system, which is intended for broadcast quality video. At the broadcasting site, which may be the satellite base station in a satellite system, the video data may be stored on a master tape in a pre-compressed format. Alternatively, the data may be stored in uncompressed format and undergo real-time MPEG-2 coding prior to transmission. For further information on DVB principles and implementation and MPEG-2 encoding, reference is directed to Electronics & Communication Engineering Journal, February 1997, Volume 9, Number 1, Special Issue on Digital Video Broadcasting and to Tudor, P.N. 'MPEG-2 video compression', Electronics & Communication Engineering Journal, December 1995, Volume 9, Number 6, pp. 257–264.

Referring to FIG. 5, in a first embodiment of the invention, the transmission apparatus 20 comprises a playback module 21 in which conventional playback circuitry reads data from a recording medium 22, for example a digital master tape containing MPEG-2 pre-compressed digital video data, and passes it to a time information signal embedding module 23. The signal embedding module 23 receives time information from a clock module 24, embeds the time information in the compressed data stream received from the playback module and sends the data to a transmission module 25 for transmission. The transmission module 25 in a digital satellite broadcasting system performs the multiplexing, modulation, error control, encryption and other functions necessary for transmission on the appropriate channel in a conventional way: see for example, "DVB channel coding standards for broadcasting compressed video services", G. M. Drury, Electronics & Communication Engineering Journal, February 1997, 9, (1), pp. 11–20.

Figure 7A:
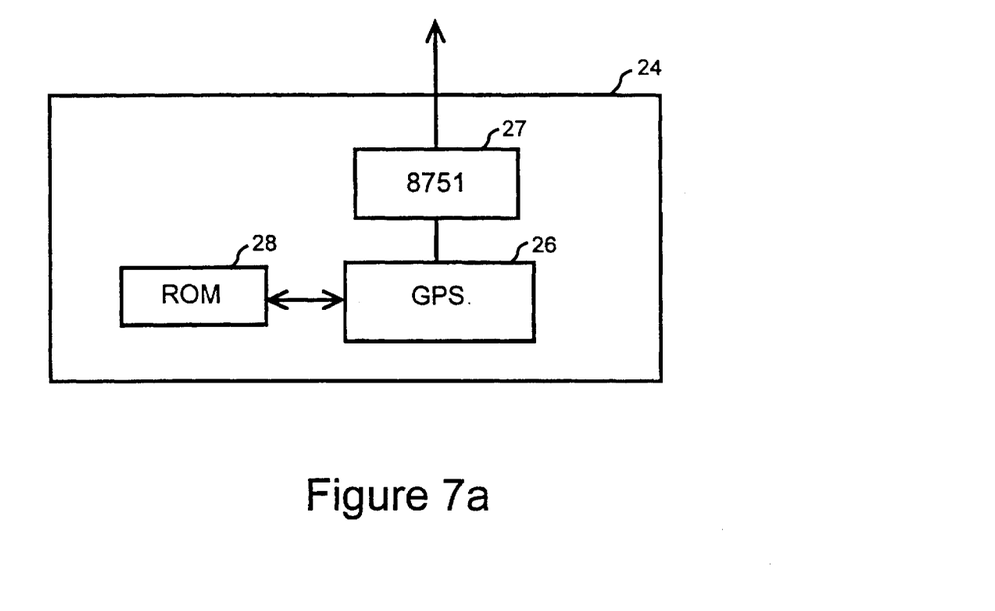
FIG. 7a is a schematic block diagram of the clock module shown in FIGS. 5 and 6.

The clock module 24 uses known techniques to provide time information in a numerical format. For example, referring to FIG. 7a, the clock module 24 can be based on a Motorola Global Positioning Satellite (GPS) receiver 26, which provides time of day and day of year information in UTC format, to a claimed accuracy of under 1 μs anywhere in the world. The time information is fed to an Intel 8751 microprocessor 27 where it is converted to an unsigned 32 bit integer which represents the time in seconds relative to a time origin provided in a ROM memory 28 at the time of manufacture.

For example, assuming a time origin of 00:00:00 on Jan. 1, 1998, if the time information is to be embedded in the video data at 18:04:32 on Jan. 9, 1999, the relevant value is 32292272, calculated as [(365+9−1)*24*3600]+ [(18*3600)+(4*60)+32]. The way in which this value is used for copy protection is described in relation to the recording apparatus 30.

Referring again to FIG. 5, the signal embedding module 23 receives the appropriate numerical value from the clock module and embeds it into the I-frames of the MPEG-2 compressed video data at appropriate intervals, for example, once per second, in the form of a digital watermark. Digital watermarking embraces a number of different techniques which operate to alter parts of the video data itself with minimal perceptible alteration of the image to be viewed. For example, PictureMarc software produced by Digimarc Corporation, Oregon, USA is used for embedding and detecting watermarks in digital images. For further information on the implementation of digital watermarking, reference is directed to 'Protecting Ownership Rights through Digital Watermarking', IEEE Computer, 29:7 (July, 1996), pp. 101–103 and the Internet at <http://www.acm.org/hlb/publications/dig-wtr/dig-watr.html>.

The use of digital watermarking obviates the need for a time information channel separate from the video data, since this can more easily be separated from the video data, so potentially defeating the copy protection. However, other than the perception that digital watermarking is a relatively secure technique, there is no limit on the methods by which the transmission time information can be associated with the video data, the transmission of a separate encrypted channel being one such possibility.

Referring to FIG. 6, the recording apparatus 30, for example a DVD-RAM recorder, comprises an input signal processing module 31 which reads the video data from the line-in terminal of the recording apparatus and sends it to the input of a data enabling gate 32 as well as to a time information signal detection module 33. This module extracts the 32 bit time information data from the video data and sends it to a time information comparison module 34, which receives current time information from a clock module 35. The requirement for the clock module 35 in the recording apparatus 30 is for time synchronisation with the clock module 24 in the transmission apparatus 20. The clock module 35 therefore uses the same arrangement as the clock module 24 as shown in FIG. 6, and provides the current time as a 32 bit value, referenced to the same time origin as the clock module 24 in the transmission apparatus 20. This current time value is supplied to the comparison module 34 which compares it with the value extracted from the input video data.

If the resulting difference is less than or equal to a predetermined value, this indicates that the attempted recording is substantially contemporaneous with the broadcast, so that an enabling signal is sent to the data enabling gate 32, which at its simplest is a gated transparent latch, which in turn allows the video data to pass to a recording module 36 so that it can be recorded onto an appropriate recording medium 37, for example a recordable DVD-video disk.

If, on the other hand, the resulting difference is greater than the predetermined value, this indicates that the attempted recording is taking place at some time after the broadcast and is therefore an attempt at making an unauthorised copy. In this case, the time information comparison module 34 does not send an enabling signal to the enabling gate 32 and the video recording attempt is blocked.

The maximum difference permitted between the transmission and current time information signals is pre-set by the manufacturer in the recording apparatus in accordance with the accuracy of synchronisation and the calculated path delay from the transmission apparatus to the recording apparatus 30. In practical devices, such errors are likely to be no more than a few seconds at most. For example, in the case of GPS, synchronisation is to an accuracy of μs and satellite path delays are likely to be under 1 s. Assuming a maximum value for difference of 10, then, if the current time that is read from the clock module is 18:04:35 on Jan. 9, 1999, the value produced by the clock module 34 is 32292275. The difference between this and the broadcast time calculated above is 3, which is less than the maximum value and so triggers the comparison module to send an enabling signal to the data enabling gate 32. If, on the other hand, the current time read from the clock module 35 is 00:05:35 on Jan. 10, 1999, the corresponding numerical value is 32313935. The difference between this and 32292272 is greater than 10, so the time comparison module does not send an enabling signal to the data enabling gate 32 and recording of the data by the recording module 36 is prevented.

Where recording is permitted, the video data recorded onto the DVD-video disk includes the original broadcast time information. It is almost inevitable that any subsequent attempt to record onto further DVD-video disks will take place more than 10 seconds after that broadcast time, so that such recording will always be prevented.

Figure 7B:
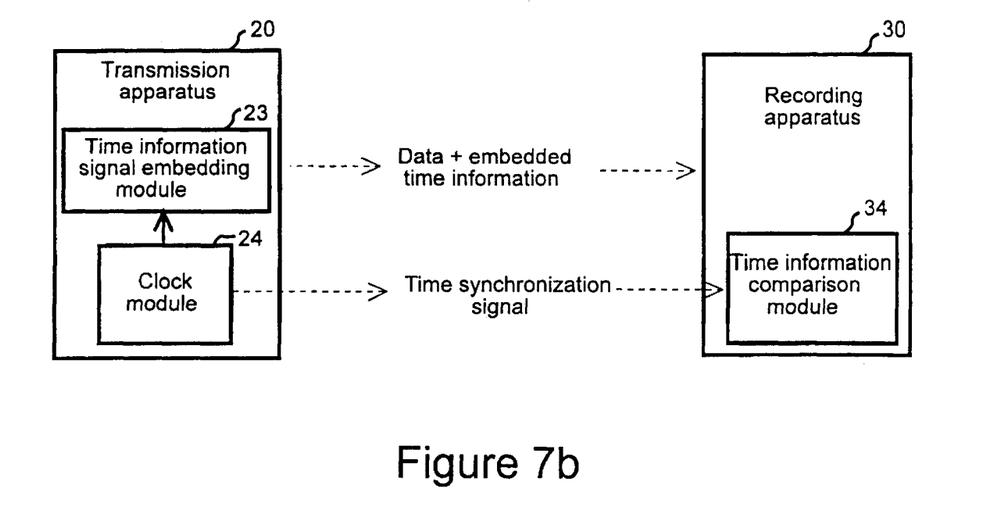
FIG. 7b is a schematic block diagram showing the provision of timing synchronisation information as an alternative to the multiple clock modules of the first embodiment.

In an alternative embodiment of the invention illustrated in FIG. 7b, the time information is provided at the transmission 20 and receiver 30 locations by a time signal transmitted by the broadcaster, for example, as is done by NHK broadcasting corporation in Japan, the signal currently being used to provide automatic user independent time information to associated conventional video recorders. The clock module 24 in the transmission apparatus 20 may be based on a GPS receiver, but no corresponding clock module is provided at the recording apparatus 30. Instead, a time synchronisation signal is supplied over the broadcast channel by the clock module 24. Both this technique and the multiple clock module approach of the first embodiment ensure that the time information is not user set so that the user is unable to easily circumvent the copy protection method.

In the event that the incoming signal does not contain time information at all, the default is for the time information signal detection module 33 to instruct the time information comparison module 34 to send enable signals to the data enabling gate 32, so that data which does not support this method of copy control can be recorded.

Although the recording apparatus 30 is shown as a plurality of modules, the functions of at least the time information signal detection module 33, the comparison module 34, the clock module 35 and the data enabling gate 32, can be carried out by a single conventional microprocessor receiving inputs from the input signal processing circuitry 31 and the GPS receiver 26 and outputting data to conventional data recording circuitry, as currently found in DVD-RAM recorders such as the Hitachi GF-1000 series. The predetermined threshold value of time difference, above which recording is prevented, can be stored in a ROM memory interfaced to the microprocessor.

Figure 8:
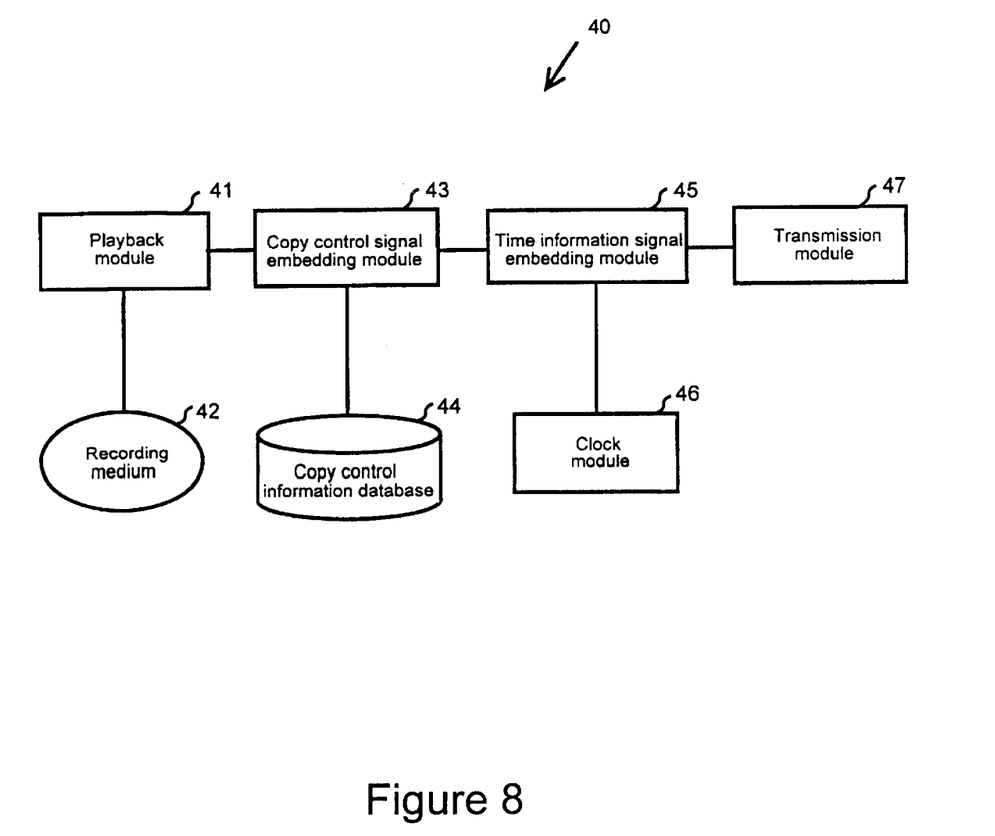
FIG. 8 is a schematic block diagram of data transmitting apparatus according to a second embodiment of the invention.

Referring to FIG. 8, in a second embodiment of the invention, the time information signal is used in addition to the copy control signal. In the transmission apparatus 40, a playback module 41 reads compressed video data from a master tape 42 and sends it to a copy control signal embedding module 43. As disclosed in relation to FIG. 1, the signal embedding module 43 embeds a copy control signal obtained from a copy control information database 44 into the data by the digital watermarking process described above. The data is then sent to a time information signal embedding module 45. The time information signal embedding module 45 reads time information from a clock module 46, the structure and function of which is described above in relation to the first embodiment. The time information is embedded in the data by using a digital watermark as described above in relation to the first embodiment. The video data is then sent to a transmission module 47 and broadcast with its embedded copy control and time information signals.

In an alternative embodiment, the time information signal is embedded in the data prior to the copy control signal.

Figure 9:
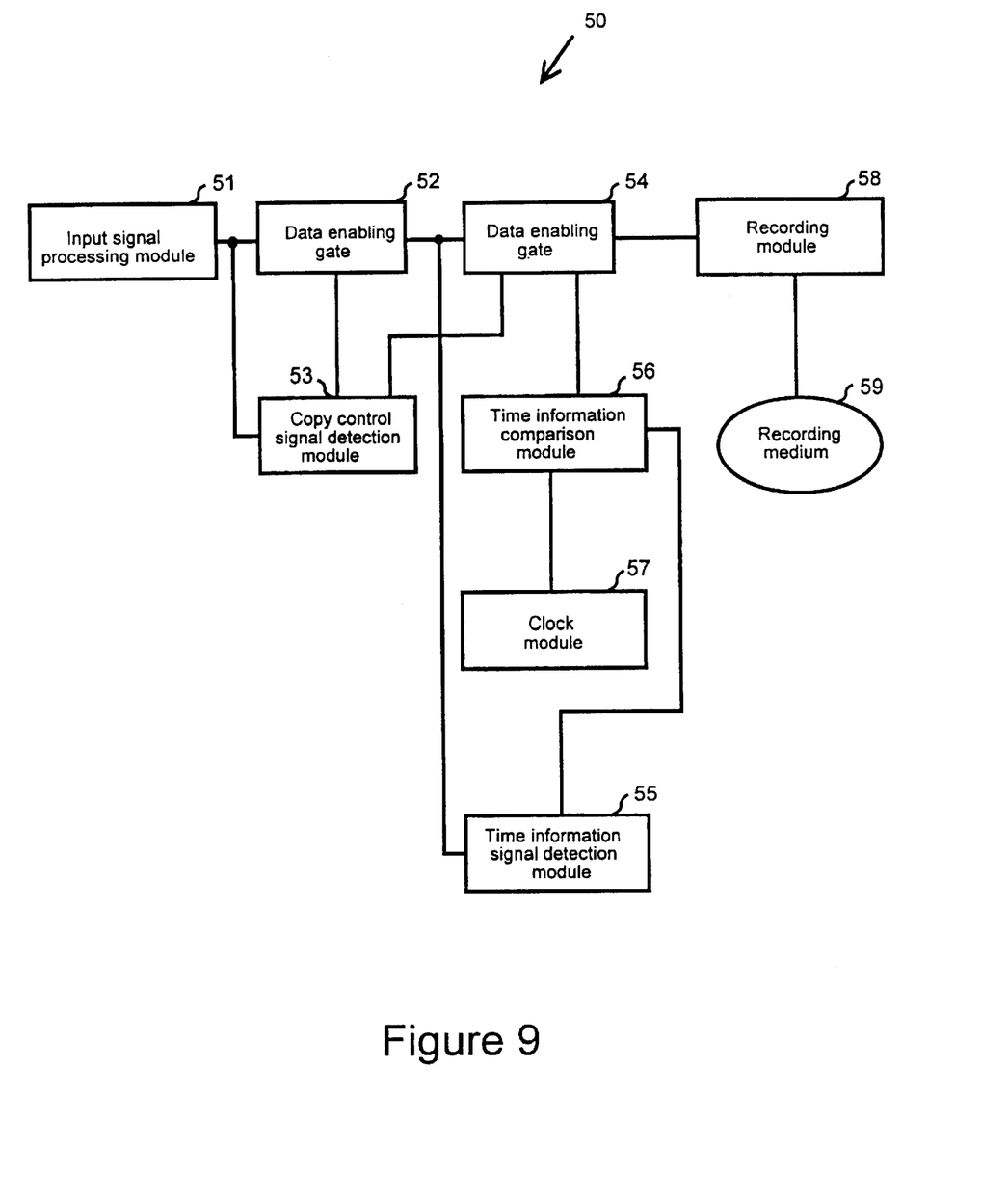
FIG. 9 is a schematic block diagram of data recording apparatus according to a second embodiment of the invention.

Referring to FIG. 9, the recording apparatus 50 of the second embodiment comprises an input signal processing module 51 which reads the video data from the line-in terminal of the recording apparatus 50 and sends it to the input of a first data enabling gate 52 as well as to a copy control signal detection module 53. The output from the first data enabling gate 52 is sent to a second data enabling gate 54 as well as to a time information signal detection module 55. The output from the copy control signal detection module 53 is sent to both the first and second data enabling gates 52, 54. The remainder of the components are arranged in the same way as in the recording apparatus 30 of the first embodiment illustrated in FIG. 7, so that a time information comparison module 56 receives time information from a clock module 57 and the time information signal detection module 55. The output of the time information comparison module 56 forms a second input to the second data enabling gate 54. The output of the second data enabling gate 54 passes to a recording module 58 which can record the data to a recording medium 59, such as a recordable DVD disk. As in relation to the first embodiment, the time information signal detection module 55 extracts the 32 bit time information data from the video data and sends it to the time information comparison module 56, where it is compared with current time information from the clock module 57, synchronised with the clock module 46 in the transmission apparatus 40.

Figure 10:
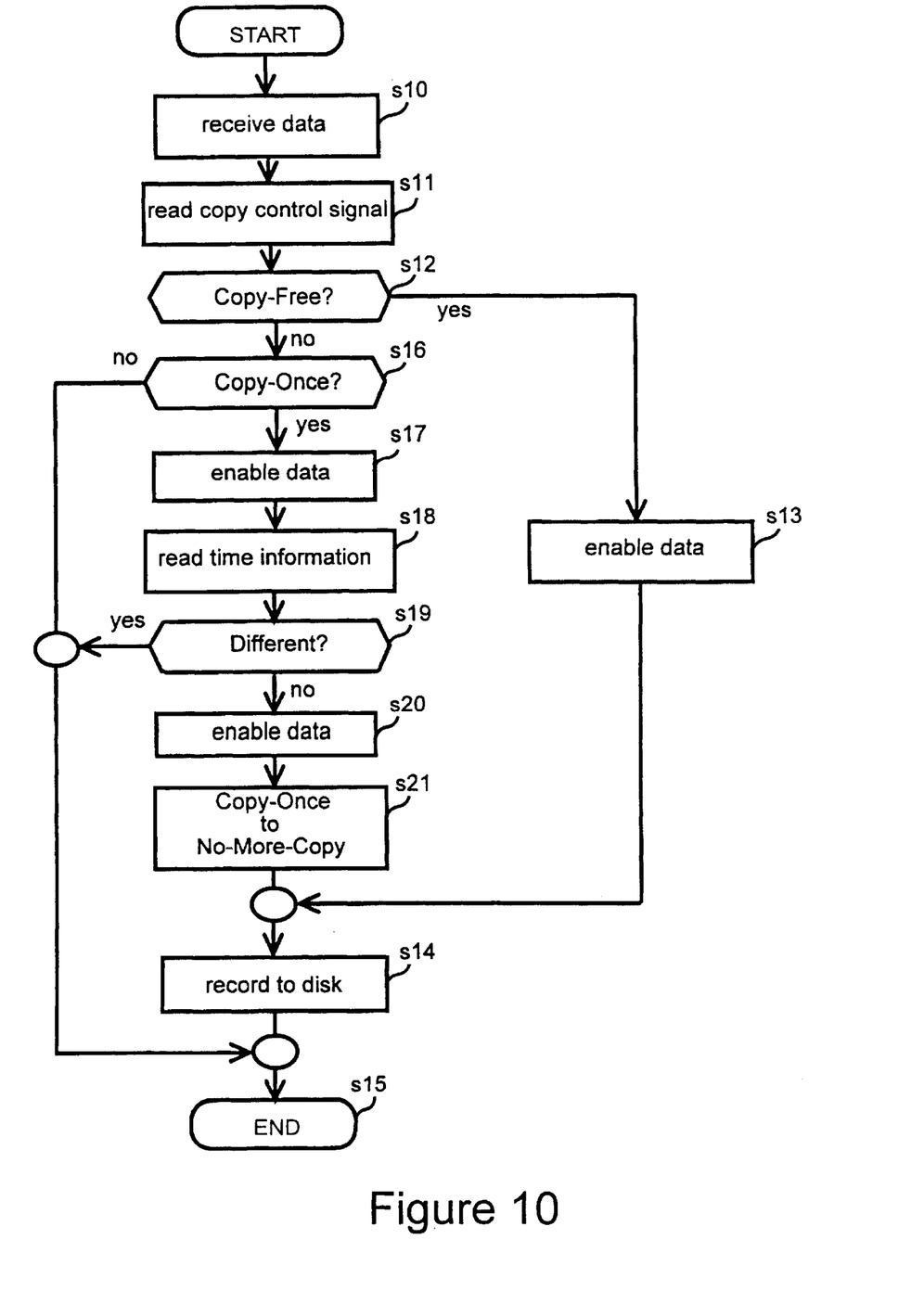
FIG. 10 is a flow diagram illustrating the operation of the recording apparatus of FIG. 9.

FIG. 10 is a flowchart showing the detailed operation of the recording apparatus 50 shown in FIG. 9. The input signal processing module 51 reads data input to the recording apparatus 50 at step s10 and sends it to the copy control signal detection module 53, which detects the copy control signal embedded in the data at step s11. At step s12, the copy control signal detection module 53 determines if the Copy-Free signal is present. If it is present, control proceeds to step s13 at which an enable signal is sent to the first and second data enabling gates 52, 54 which then allow the data to pass to the recording module 58 and to be recorded to the recording medium 59 at step s14. The sequence of recording apparatus operations stops at step s15.

If the Copy-Free signal is not detected at step s12, step s16 is executed at which the copy control signal detection module 53 determines whether the Copy-Once signal is present. If the Copy-Once signal is not detected, the only possibilities remaining are that the copy control signal is set to Never-Copy or No-More-Copy. In either case, recording is not permitted, so control passes to terminating step s15. In this case, no enabling signal is sent to the first data enabling gate 52, so that the received data is unable to pass to the recording module 58.

In the event that the Copy-Once signal is detected at step s16, control passes to step s17, at which an enabling signal is sent to the first data enabling gate 52 only, which in turn allows the data to be passed to the input of the second data enabling gate 54 and to the time information signal detection module 55. At step s18, this module extracts the time information from the video data and sends it to the time information comparison module 56, which also reads the current time information from clock module 57. At step s19, the comparison module 56 compares the two values. If the resulting difference is less than or equal to the predetermined threshold value, as described in relation to the first embodiment, control passes to step s20 and an enabling signal is sent to the second data enabling gate 54 which allows the video data to pass to the recording module 58. Control then passes to step s21, at which the recording module 58 changes the embedded Copy-Once signal to No-More-Copy, so that further recordings are prevented. Step s14 follows, at which the recording module 58 records the data, including the new embedded copy control signal, onto the appropriate recording medium 59.

If, on the other hand, at step s19, the resulting difference is found to be greater than the predetermined value, control passes to terminating step s15, so that the time information comparison module 56 does not send an enabling signal to the second data enabling gate 54, and the video recording attempt is blocked.

Figure 11:
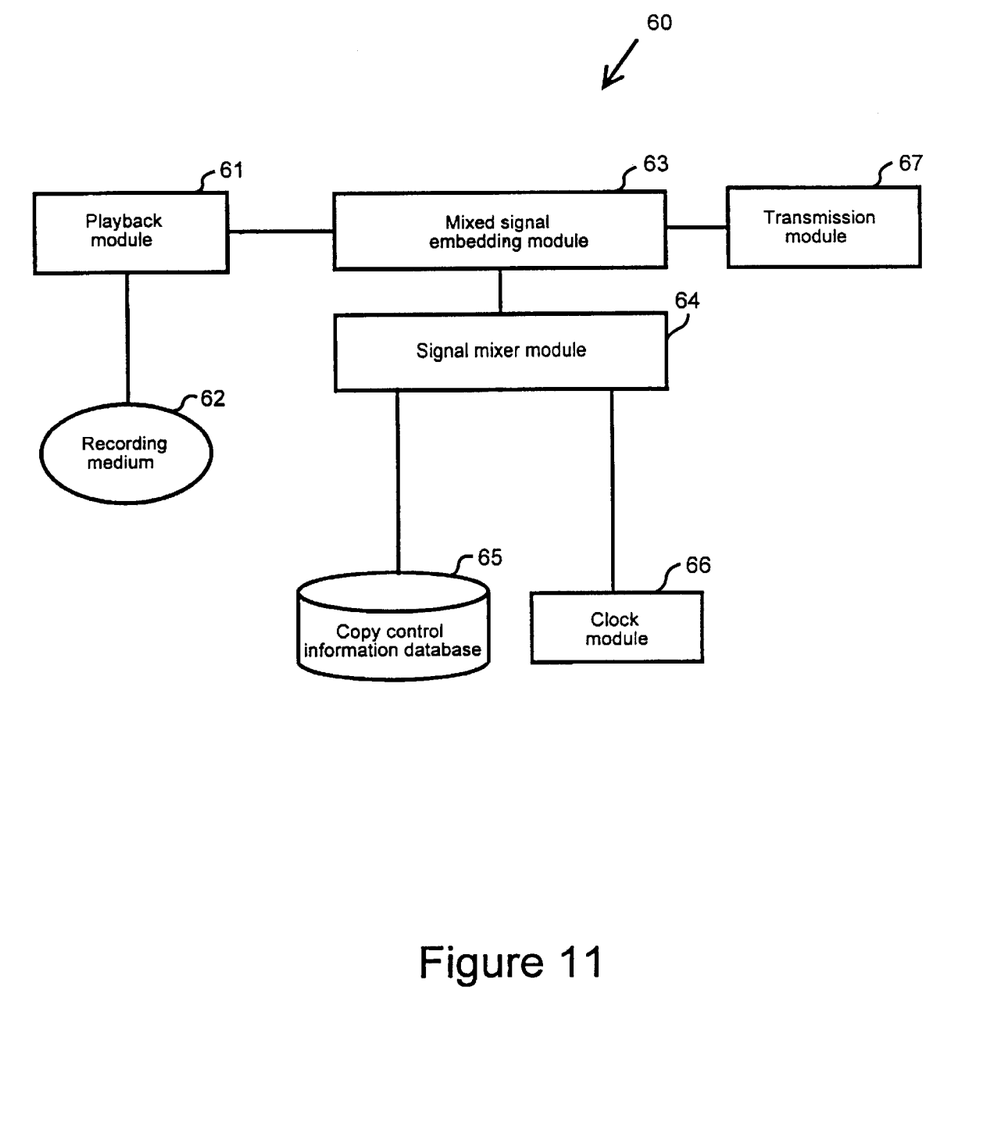
FIG. 11 is a schematic block diagram of data transmitting apparatus according to a third embodiment of the invention.

Referring to FIG. 11, in a third embodiment of the invention, the copy control and time information signals are mixed before being embedded in the compressed video data stream. In the transmission apparatus 60, a playback module 61 reads data from a recording medium 62, for example a digital master tape containing MPEG-2 pre-compressed digital video data, and passes it to a mixed signal embedding module 63 which embeds a mixed copy control and time information signal into the data stream by, for example, a digital watermarking process as described above. The mixed signal is generated at a signal mixer module 64 by combining a copy control signal from a copy control information database 65 and a transmission time information signal from clock module 66. The video data is then sent to a transmission module 67 for transmission by, for example, digital satellite broadcasting. The playback module 61, copy control information database 65, clock module 66 and transmission module 67 are all as described in relation to the first and second embodiments above.

A recording apparatus according to the second embodiment of the invention is capable of decoding the mixed signal produced by the transmission apparatus of the third embodiment.

Although embodiments of the invention have been described primarily with reference to DVD systems, the invention may be used in conjunction with any other form of data recorder including analog devices, by, for example, incorporating the time information into the analog signal, as well as for other forms of digital data recording systems such as D-VHS devices, hard-disk drives and recordable CD-ROM devices.

Figure 12A:
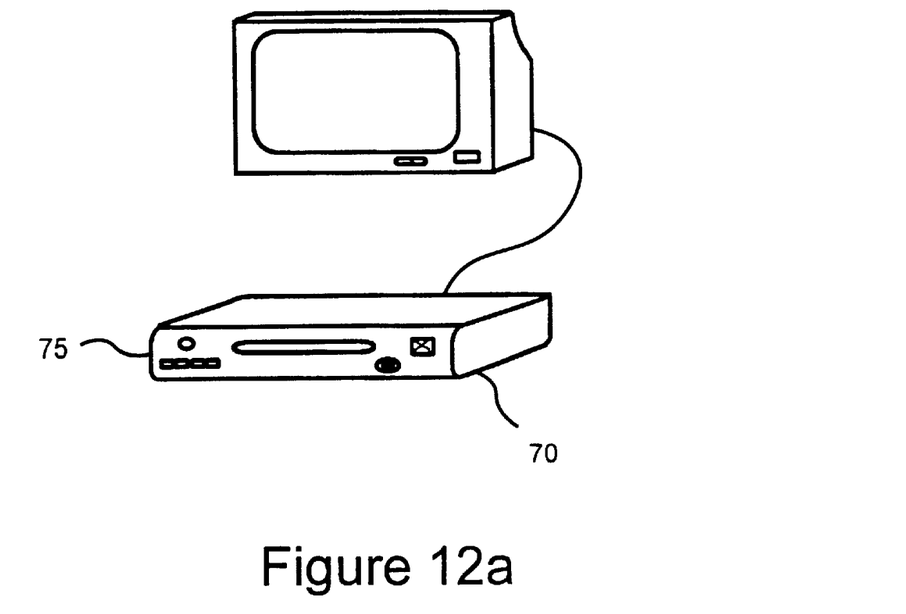
FIG. 12a shows a video recorder in accordance with the invention.
Figure 12B:
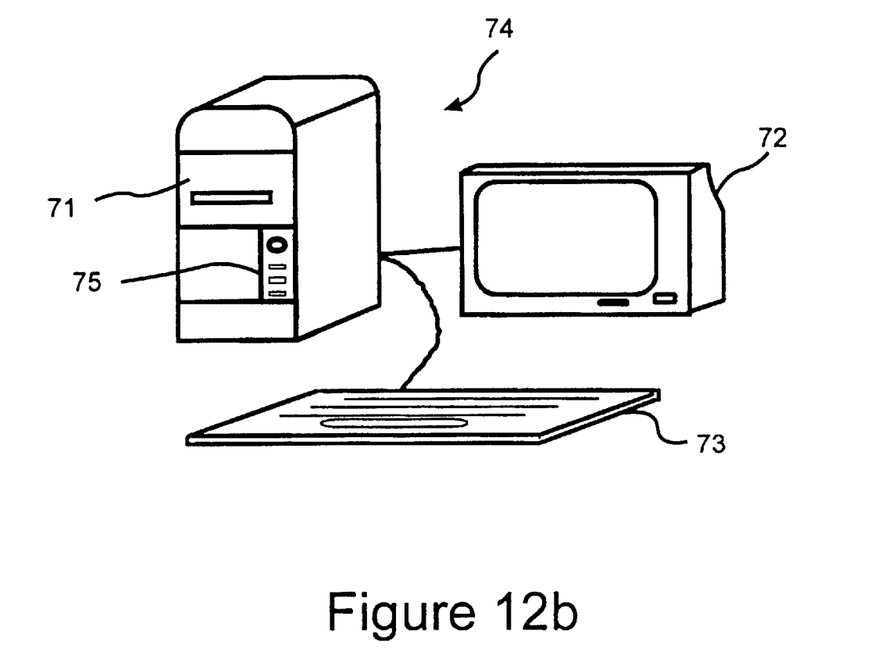
FIG. 12b shows a hard-disk drive for a PC in accordance with the invention.

Particular embodiments of the invention are shown in FIGS. 12a and 12b. For example, FIG. 12a shows a video recorder 70 incorporating recording apparatus according to the invention, while FIG. 12b shows a hard-disk drive 71 incorporating recording apparatus according to the invention, the hard-disk drive 71 forming part of a PC comprising monitor 72, keyboard 73 and tower case 74 which includes the hard-disk drive, processor and associated data processing circuitry.

A copy protection system according to the invention may be used in a pay-per-view (PPV) system, in which users are charged for recording copy protected data. In this case, the recording apparatus may provide some external indication, preferably visual, of the copy protection status of the data being received. For example, an indicator lamp 75 may appear on the recording apparatus 70, 71. This lamp can show, for example, a green light when the data being received is not copy-protected, or not scrambled in a PPV system, and an amber light, indicating that the user is being charged to record the data, when the data being received is copy protected, or scrambled in a PPV system.

The operation of the lamp can, for example, be controlled by the copy control signal detection module 53, to be green when the Copy-Free signal is detected and amber when the Copy-Once signal is detected.

The indicator lamp may show a further colour, such as red, when the data cannot be recorded at all, for example, when the Never-Copy or No-More-Copy signals are detected, or when the time information comparison module 34, 56 determines that the data should not be copied.

What is claimed is:

1. Copy protection apparatus comprising:
   data transmission apparatus for sending data and data recording apparatus for recording data received from the transmission apparatus, said data transmission apparatus including:
   a first timing module for providing a first time information signal; and
   a time signal embedding module for associating said first time information signal with the data to be transmitted to provide time information relating to the transmission time of the data;
   said data recording apparatus including:
   a second timing module for providing a second time information signal relating to current time, said second time information signal being synchronized with the first time information signal;
   a comparison module for comparing the time information relating to the transmission time of the data with the time information relating to current time to determine difference data which is a function of the time difference between the data transmission time and the current time, the comparison module further being arranged to determine whether the transmission and recording of said data are substantially contemporaneous by determining whether the difference data is less than a synchronisation error threshold, and if so, providing a signal to permit recording of the data.

2. Apparatus according to claim 1 wherein the time signal embedding module comprises means configured to embed the transmission time information in the data as a digital watermark.

3. Apparatus according to claim 1 wherein the transmission time information and the current time information are each referenced to the same time origin.

4. Apparatus according to claim 1, including a copy control signal embedding module for associating with the data to be transmitted a copy control signal indicating the status of the data.

5. Apparatus according to claim 4, wherein the copy control signal is a Copy-Free, Copy-Once or Never-Copy signal.

6. Apparatus according to claim 4, wherein the copy control signal is embedded in the data as a digital watermark.

7. Apparatus according to claim 4, including a signal mixer for combining the copy control signal with the transmission time information prior to embedding the combined signal into the data.

8. Apparatus according to claim 1, wherein the synchronisation error threshold includes a path delay from the transmission apparatus to the recording apparatus.

9. Data transmission apparatus comprising:
- a timing module for providing a time information signal; and
- a time signal embedding module for associating said first time information signal with the data to be transmitted to provide time information relating to the transmission time of the data, such that when the data is received by corresponding data recording apparatus, the transmission time information can be compared with information related to current time so as to determine difference data which is a function of the time difference between the transmission time and the current time, and to determine whether the transmission and recording of said data are substantially contemporaneous by determining whether the difference data is less than a synchronisation error threshold, and if so, providing a signal to permit recording of the data.

10. Apparatus according to claim 9 wherein the time signal embedding module comprises means configured to embed the transmission time information in the data as a digital watermark.

11. Data recording apparatus for recording data transmitted thereto, the data being associated with a first time information signal related to the data transmission time, comprising:
- a timing module for providing a second time information signal relating to current time, said second time information signal being synchronized to the first time information signal; and
- a comparison module for comparing the transmission time information with the information related to current time so as to determine difference data which is a function of the time difference between the data transmission time and the current time, the comparison module further being arranged to determine whether the transmission and recording of said data are substantially contemporaneous by determining whether the difference data is less than a synchronisation error threshold, and if so, providing a signal to permit recording of the data.

12. Apparatus according to claim 11, wherein the transmission time information is embedded in the data as a digital watermark.

13. Apparatus according to claim 11, wherein the transmission time information and the current time information are each referenced to the same predetermined time origin.

14. Apparatus according to claim 11, wherein the timing module includes a GPS receiver.

15. Apparatus according to claim 11, wherein the timing module receives a time signal broadcast by the transmission apparatus.

16. Apparatus according to claim 11, wherein if the difference data exceeds a synchronisation error threshold, it is determined that the transmission and recording of the data are not substantially contemporaneous and recording is prevented.

17. Apparatus according to claim 11, wherein the difference data comprises the time difference between the data transmission time and the current time.

18. Apparatus according to claim 11, wherein the data recording apparatus includes a time information signal detection module for extracting transmission time information from the received data.

19. Apparatus according to claim 11, wherein the data recording apparatus includes a copy control signal detection module for extracting a copy control signal from the received data.

20. Apparatus according to claim 19, wherein the data recording apparatus further comprises a processing module for deciding, in dependence only on the copy control signal, whether to prevent recording of the data.

21. Apparatus according to claim 11, comprising a digital video recorder.

22. Apparatus according to claim 11, comprising a recordable data storage device for a computer.

23. Apparatus according to claim 11, including an indicator for indicating the copy protection status of the data.

24. Apparatus according to claim 23, wherein the indicator comprises an indicator lamp.

25. Copy protection apparatus comprising:
- data transmission apparatus including timing circuitry for providing a first time information signal and processing circuitry configured to associate the first time information signal with the data to be transmitted to provide time information relating to the transmission time of the data; and
- data recording apparatus for recording data received from the transmission apparatus including timing circuitry for providing a second time information signal relating to current time, said second time information signal being synchronized with said first time information signal, and processing circuitry configured to compare the transmission time information with the information related to current time so as to determine difference data which is a function of the time difference between the data transmission time and the current time, and to determine on the basis of the difference data whether recording of the received data is to be permitted, said processing circuitry being further configured to determine whether the transmission and recording of said data are substantially contemporaneous by determining whether the difference data is less than a synchronisation error threshold, and if so, said processing circuitry is arranged to provide a signal to permit recording of the data.

26. A digital video recorder comprising:
- a digital video data receiver for receiving video data with which information related to the data transmission time is associated;
- time information detection circuitry for recovering the transmission time information associated with the received data;
- comparison circuitry for comparing the recovered time information with information related to current time so as to determine difference data which is a function of the time difference between the data transmission time and the current time; and
- processing circuitry for determining on the basis of the difference data whether recording of the received video data is to be permitted, said permission being provided if the transmission and recording of said data are substantially contemporaneous, which occurs in the event that the difference data is determined to fall within a synchronisation error threshold.

27. A recordable data storage device for a computer comprising:
- a digital data receiver for receiving data transmitted thereto, the data being associated with information related to the data transmission time;
- time information detection circuitry for recovering the transmission time information associated with the received data;
- a comparison module for comparing the recovered time information with information related to current time so as to determine difference data which is a function of the time difference between the data transmission time and the current time; and processing circuitry for determining on the basis of the difference data whether recording of the received data is to be permitted, said permission being provided if the transmission and recording of said data are substantially contemporaneous, which occurs in the event that the difference data is determined to fall within a synchronisation error threshold.

28. A method of copy protection for a data recorder comprising:

receiving data with which information related to the data transmission time is associated;

recovering the transmission time information associated with the received data;

comparing the recovered time information with information related to current time so as to determine difference data which is a function of the time difference between the data transmission time and the current time; and determining whether the transmission and recording of the data are substantially contemporaneous, said determination further comprising determining whether the difference data is less than a synchronisation error threshold and if so, providing a signal to permit recording of the data.

29. A method according to claim 28, including preventing the recording of the received data when the difference data exceeds the synchronisation error threshold.

* * * * *